United States Patent [19]

Takamura et al.

[11] 3,951,687

[45] Apr. 20, 1976

[54] NICKEL-ZINC STORAGE BATTERY

[75] Inventors: Tsutomu Takamura, Kawasaki; Tamotsu Shirogami, Yamato; Yuichi Sato, Kawasaki; Kenji Murata; Hirokazu Niki, both of Yokohama, all of Japan

[73] Assignee: Tokyo Shibaura Electric Co., Ltd., Japan

[22] Filed: Nov. 20, 1974

[21] Appl. No.: 525,667

[30] Foreign Application Priority Data

Nov. 21, 1973 Japan.............................. 48-130952

[52] U.S. Cl................................... 136/28; 136/30
[51] Int. Cl.²............................................ H01M 4/38
[58] Field of Search.......................... 136/30, 31, 28

[56] References Cited
UNITED STATES PATENTS

| | | | |
|---|---|---|---|
| 3,493,434 | 2/1970 | Goodkin | 136/30 |
| 3,516,862 | 6/1970 | Van der Grinten | 136/30 |

*Primary Examiner*—Howard S. Williams
*Assistant Examiner*—C. F. LeFevour
*Attorney, Agent, or Firm*—Cushman, Darby & Cushman

[57] ABSTRACT

Provided is a nickel-zinc storage battery prepared, preferably, by winding into a whirlpool a sheet-like zinc electrode, a sheet-like nickel electrode and a separator with the separator interposed between the zinc and nickel electrodes, said zinc electrode being obtained by bonding under pressure to a collector a mixture sheet consisting of zinc oxide, zinc, bismuth oxide, calcium hydroxide and fluoroplastic, said nickel electrode being obtained by bonding under pressure an oxide of nickel to a collector together with a conductive material, said separator being obtained by coating on an alkali-resisting nonwoven fabric a mixture of polyvinyl alcohol and at least either of one selected from the group consisting of boric acids and metal oxides having low solubility to alkali solution and drying the nonwoven fabric thus coated.

6 Claims, 2 Drawing Figures

NICKEL-ZINC STORAGE BATTERY

BACKGROUND OF THE INVENTION

This invention relates to a nickel-zinc storage battery using zinc as a anode material, nickel oxide as cathode material and an alkali solution as an electrolyte.

The nickel-zinc storage battery has the advantages that it has higher operating voltage as compared with a nickel-cadmium storage battery and utilizes no such substance as causes occurrence of public nuisance due to, for example, cadmium and is decreased in the cost of its raw materials. For this reason, a wide variety of improvements have heretofore been made, and as the result an angular nickel-zinc storage battery having excellent performance is today put on sale.

On the other hand, as electric home appliances are rendered potable, the demand for a secondary battery as the power source whose configuration is a compact cylinder such as the configuration of a C-type, D-type or AA-type dry element battery has been increased. However, extreme difficulties have been encountered in forming the nickel-zinc battery into a compact cylindrical shape. The reason resides in that where the nickel-zinc battery is constructed such that as in the alkali-manganese battery construction an cathode active material is molded into a cylindrical shape and a gelatinized zinc anode is disposed in the central part of the cylindrical cathode, the following drawbacks are produced. That is, 1. Since the reaction speed of the cathode active material under high load is low, the battery capacity is not sufficiently large.
2. The electrode body is changed in its shape and degraded or deteriorated due to expansion or shrinkage of the cathode active material during the charge-and-discharge cycle.
3. The dispersed condition of zinc at the gelatinized zinc electrode presents a variation during the charge-and discharge cycle. In addition, a dendrite becoming a cause for internal short circuit is likely to be produced at the charging time.
4. Owing to a small contact area of the anode electrode with the cathode electrode the battery impedance is increased, so that a large voltage drop is produced under high load.
5. Since the density of current passing through the separator interposed between the anode and cathode is high, a so-called dendrite is likely to be produced when the battery is charged, and arrival at the cathode of the dendrite produced in the anode causes the occurrence of short-circuit trouble or causes a remarkable shortening of the battery life.

In view of the above, it is considered that, as in the nickel-cadmium storage battery, construction is made, without adopting the construction of an alkali-manganese battery type, such that both the anode and cathode electrode members are formed into sheet-like configurations; the electrode members thus formed are wound in the shape of a whirlpool into a columnar configuration; and thereafter the resultant electrode body is housed in a cylindrical case. If construction is made as such, the electrode surface area will be increased and the distance between both electrodes will be shortened, so that the heavy load characteristic is improved and simultaneously the battery capacity is increased. However, the major demerit produced when the battery construction is made as above is the shortening of the battery life. That is, in whatever way the component proportions or configurations of the electrode or separator heretofore proposed may be combined, the formation of the electrode into a whirlpool-like configuration causes the separator or electrode to be largely distorted thereby to promote the battery deterioration, and the shortening of the inter-electrode distance causes an increase in the frequency of internal short-circuits occurring due to the dendrite glown at the charging time. For these reasons, difficulties are presented in elongating the battery cycle life up to a value greater than 50 cycles.

SUMMARY OF THE INVENTION

The object of the present invention is to provide a nickel-zinc storage battery prepared by winding both the electrodes in the shape of a whirlpool and housing the resultant electrode body within a cylindrical case and largely improved in respect of the charge-and-discharge cycle life.

The above object has been achieved by recognizing the characteristics of the foregoing whirlpool-shaped battery and making various investigations of the respective component proportions or respective configurations of the zinc electrode and separator. The features of the present invention based on the combination of such component proportions or configurations are as follows. That is to say, the features of the nickel-zinc storage battery of the invention reside in using as the anode a sheet-like zinc electrode obtained by bonding under pressure to a collector a mixture sheet consisting of 60 to 85 weight percent of zinc oxide, 5 to 20 weight percent of zinc powder, 2 to 30 weight percent of bismuth oxide, 5 to 20 weight percent of calcium hydroxide and 2 to 13 weight percent of fluorine contained resin and in using as the positive electrode a sheet-like nickel electrode obtained by bonding under pressure to a collector an oxide of nickel together with a conductive material and in using as the separator being interposed between said zinc and nickel electrodes obtained by coating on an alkali-resisting woven or nonwoven fabric a mixture of aqueous polyvinyl alcohol solution and at least either of one selected from boric acids and metal oxides having low solubility to alkali solution, and drying the nonwoven fabric thus coated.

DETAILED DESCRIPTION OF THE PREFERRED EMBODIMENTS

Figure 1:
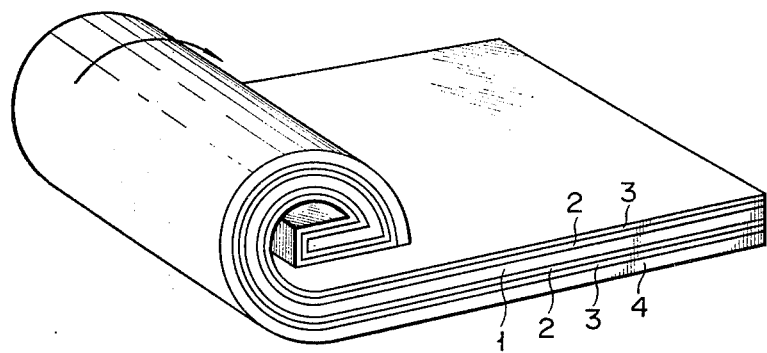
FIG. 1 is a view for explaining the electrode construction of a nickel-zinc storage battery of the invention.

There will now be described a concrete construction of the nickel-zinc storage battery of the invention.

As previously mentioned, the sheet-like zinc electrode of the nickel-zinc storage battery of the invention is one prepared by bonding under pressure to a collector a mixture sheet consisting of 60 to 85 weight percent of zinc oxide, 5 to 20 weight percent of zinc, 2 to 30 weight percent of bismuth oxide, 5 to 20 weight percent of calcium hydroxide and 2 to 13 weight percent of fluorine-contained resin. This sheet-like electrode is manufactured, for example, as follows. An aqueous solution dispersed with fluorine-contained resin is added to a mixture consisting of zinc oxide powder, zinc powder, bismuth oxide powder and calcium hydroxide powder, and the resultant mass is kneaded into a paste-like mass, which is rolled to a thickness of 0.2 to 0.7 mm by application to a roller. The mass thus rolled is bonded under pressure to both faces of the collector by rolling. Thus is obtained a sheet 0.3 to 2 mm thick. This zinc electrode sheet is wound jointly with a nickel electrode sheet with the separator interposed therebetween as later described and then is charged, so that the zinc oxide becomes an active material. And simultaneously the bismuth oxide powder is metallized due to the oxidation-reduction reaction with the zinc, and the mass thus metallized becomes a porous body, which adheres to the collector to increase the conductivity of zinc oxide thereby facilitating the charging thereinto. This is based on the utilization of the characteristics of bismuth property that since the dissolution potential of bismuth is more positive than the potential of zinc, the bismuth, once having been metallized, is always maintained in a metallized condition also when the zinc is discharged.

The conventional zinc electrode uses amalgamated zinc for the purpose of suppressing the evolution of a hydrogen gas, whereas the present zinc electrode uses no mercury compound. This is one of the characterizing features of the invention.

Next, as the nickel electrode (cathode) there is used a sheet-like one prepared by bonding under pressure to a collector an oxide of nickel together with a conductive material. Namely, there can be used a sheet-like electrode obtained by impregnating a nickel-sintered material with a nickel hydroxide or a sheet-like electrode having a thickness of 0.5 to 2 mm obtained by thin uniformly bonding under pressure to the collector (nickel or nickel-plated cloth, expanded metal or punched metal) a mass prepared by adding a binder to a mixture of nickel oxide (including a composed high-valent nickel oxide) and graphite powder.

A separator for use in the nickel-zinc storage battery of the invention is the one obtained by coating on an alkali-resisting porous body a mixture of polyvinyl alcohol and at least either of one selected from the group consisting of boron compounds and metal oxides having low solubility to alkali solution and drying the porous body thus coated. As the metal oxides having low solubility to alkali solution there are magnesium oxide, calcium oxide, titanium oxide, zirconium oxide, aluminium oxide, $\beta$-alumina. As the boron compounds there are boron oxides, boric acid, metaboric acid or salts containing these. As the alkali-resisting porous body there can be used a woven fabric or nonwoven fabric consisting of at least one fiber made of a natural or a synthetic resin having high alkali-resistance such as polyvinyl formal, polyamide, polyethylene, polystyrene, polyvinyl chloride-polyvinyl alcohol, polyvinyl chloride-acrylic ester or acrylonitrile-polyvinyl chloride copolymer. Such porous body is preferred to have a thickness of about 0.05 to 0.15 mm.

Since all the pore in the porous body is filled with the aqueous solution of polyvinyl alcohol during the coating, the above separator has no such large pinhole as permits passage of zinc ions formed due to the battery discharge but is very excellent in ion conductivity, alkali-resistance and acid-resistance. Furthermore, this separator is markedly excellent also in mechanical strength as compared with a cellophane or polyvinyl alcohol film and functions to interrupt the dendrite grown in the zinc electrode at the charging time from being passed through the separator into the positive electrode to give rise to an internal short-circuit trouble, thereby contributing to prolongation of the charge-and-discharge cycle life of battery.

The reasons why the foregoing separator has excellent characteristics are as follows. Namely, where the boron compounds are added, the cross linking action between polyvinyl alcohol, boron and oxygen is promoted to obtain a cross-linked material having extremely high durability and low water-solubility. Where the metal oxides are added, the hydropholic property of the alkali solution is increased, and the electrical resistance of the storage battery is decreased, and the cations formed by the addition of the metal oxides prevent, due to the repulsion of charges, the zinc ions formed as the result of battery discharge from being passed toward the anode electrode side, so that the undesirable effect of the zinc ions upon the anode electrode is reduced.

There will now be explained the construction of the nickel-zinc storage battery obtained by combining the foregoing zinc electrode, nickel electrode and separator.

Figure 2:
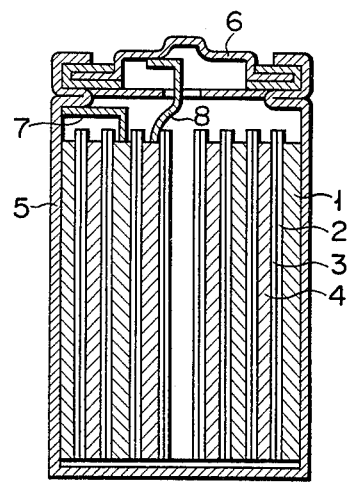
FIG. 2 is a sectional view illustrating the condition in which the electrodes of FIG. 1 are housed within a cylindrical case.

First, a zinc electrode sheet, nickel electrode sheet and separator sheet are overlapped and wound in the form of a whirlpool so as to obtain a columnar body. For example, as shown in FIG. 1, a separator 2 and a nylon nonwoven fabric 3 are superposed upon each of both surfaces of a zinc electrode, and a nickel electrode is further superposed upon the superposed body from outside, and the resultant body is wound from its one end to obtain a columnar electrode body. The portion at the other end of said resultant body at which winding is terminated is fastened, for example, by an adhesive tape so as not to cause said body to be unwound. Said columnar electrode body, as shown in FIG. 2, is housed in a metal-made cylindrical case 5, which is charged with an alkali solution as an electrolyte and thereafter covered and sealed. In FIG. 2, a reference numeral 6 denotes a metal-made covering, which is electrically insulated from the cylindrical case 5. This covering 6 becomes an cathode terminal while the cylindrical case 5 a anode terminal.

In such a manner as heretofore mentioned, the nickel-zinc storage battery can be formed into a compact cylinder. The nickel-zinc storage battery of the invention based on the combination of the zinc electrode and the separator respectively having excellent characteristics is recognized as having been largely prolonged in the charge-and-discharge cycle life without being deteriorated due to the electrode distortion as in the case of the conventional whirlpool shape electrode.

This invention will be more fully understood by reference to examples which follow:

EXAMPLE 1

Raw materials of $ZnO$, $Zn$, $Bi_2O_3$, $Ca(OH)_2$ and PTFE (PTFE: polytetrafluoroethylene) dispersed solution were mixed in the weight ratio 80:10:10:11:5.7, and while water was further added to the mixed raw materials as required, the resultant mass was well kneaded and was rolled by a roller to obtain a sheet having a thickness of 0.4 mm. This sheet was superposed upon both surfaces of a silver expanded sheet having a silver wire spot-welded thereto as a lead, and was again pressed and bonded together. The resultant sheet was cut into a width of 3.5 cm to obtain a zinc electrode.

As a nickel electrode a sheet was prepared by impregnating with Ni(OH$_2$) into a sintered material sheet obtained by sintering a carbonyl nickel to both surfaces of a nickel expanded sheet having a nickel lead. For the C-size battery the sheet was cut into a width of 3.8 cm and a length of 22 cm. As a storage battery one having a capacity of about 1300 to 1500 m AH was prepared.

As a separator there was used one prepared by coating a mixed viscous liquid of 10 weight parts of polyvinyl alcohol, 1.2 weight parts of boric acid and 88.8 weight parts of water on both surfaces of a nonwoven fabric made of acrylonitrile-vinyl chloride copolymer having a thickness of 0.06 mm and drying the nonwoven fabric thus coated.

The foregoing zinc electrode, nickel electrode and separator, as shown in FIG. 1, were wound in the shape of a whirlpool into a columnar electrode body, which was housed in a cylindrical case as shown in FIG. 2 to obtain a storage battery.

The storage battery of C-size thus obtained had a capacity of more than 1.2 AH. After the storage battery was charged at a discharging rate of 5 hours, it was discharged with the same current density, thereby to examine, on the assumption that a period of time in which the voltage is reduced to a level of 1.0 volt be one cycle, over how many cycles the charge-and-discharge battery life is maintained. As the result, the charge-and-discharge battery life was maintained over 300 cycles by the time when the battery capacity is reduced to ½ the initial capacity.

As a control, the following battery was prepared. As a zinc electrode there was employed one which is prepared by forming, as in the above example, into a sheet a mixture of ZnO, Zn, Hg, and PTFE kneaded in the weight ratio 80:10: 10:5. As a separator there was employed one which is prepared by overlapping three sheets of cellophanes and further superposing a nylon nonwoven fabric having a thickness of 0.5 mm upon the cellophane sheets overlapped. As a nickel electrode there was employed the same sheet as used in the above example. The foregoing zinc electrode, separator and nickel electrode were formed into a whirlpool-shaped electrode body in the same manner as in the above example. This electrode body was similarly housed in a cylindrical case to obtain a C-size storage battery.

The C-size storage battery of the control was subjected to the charge-and-discharge cycle test under the same condition as the above example. As the result, the charge-and-discharge battery life was only maintained over 38 cycles by the time when the battery capacity is reduced to ½ the initial capacity.

EXAMPLE 2

As a separator there was used a sheet which was prepared by coating mixture of 10 weight percent of polyvinyl alcohol, 10 weight percent of magnesium oxide and 80 weight percent of water on a nonwoven fabric of acrylonitrile-vinyl chloride copolymer and drying the nonwoven fabric thus coated. A storage battery having a construction similar to that of Example 1 was prepared by using the same zinc electrode and nickel electrode as those used in Example 1, and was subjected to the same charge-and-discharge cycle test as in Example 1. As the result, the cahrge-and-discharge battery life was maintained over 350 cycles.

EXAMPLE 3

As a nickel electrode there was used a sheet-like nickel electrode obtained by uniformly pressing to a nickel cloth a mixture of nickel oxide, carbon and polystyrene bearing a weight ratio of 85:15:8. As a zinc electrode and separator there were used the same zinc electrode and separator as in Example 1. The resultant storage battery was subjected to the same charge-and-discharge cycle test. As the result, the charge-and-discharge battery life was maintained pver 330 cycles.

EXAMPLE 4

A storage battery having a construction similar to that of Example 1 was prepared by using as a collector a silvered copper expanded sheet for the zinc electrode and a silvered nickel expanded sheet for the nickel electrode, and was subjected to the same charge-and-discharge cycle test. The results are substantially the same as those of Example 1. Further, also in the cases where a metal net sheet (0.05 to 0.2 mm thick) was used for both the zinc and nickel electrodes instead of the respective expanded metal sheets and where a punched metal sheet (0.05 to 0.2 mm) was similarly used, the results are substantially the same as those of Example 1.

What we claim is:

1. In a nickel-zinc storage battery wherein a sheetlike separator is interposed between a sheet-like zinc electrode and a sheet-like nickel electrode; and the columnar electrode body is housed in a cylindrical case, said nickel-zinc storage battery characterized in that said sheet-like zinc electrode is prepared by bonding under pressure to a collector a mixture sheet consisting of 60 to 85 weight percent of zinc oxide, 5 to 20 weight percent of zinc, 2 to 30 weight percent of bismuth oxide, 5 to 20 weight percent of calcium hydroxide and 2 to 13 weight percent of fluorine-contained resin; said sheet-like nickel electrode is prepared by bonding under pressure to a collector an oxide of nickel together with a conductive material; and said sheet-like separator is prepared by coating on an alkali-resisting woven or nonwoven fabric a mixture of polyvinyl alcohol and at least either of one selected from the group consisting of boron compounds and metal oxides having low solubility to alkali solution.

2. A nickel-zinc storage battery according to claim 1 wherein the sheet-like zinc electrode and nickel electrode are wound into a whirlpool with the sheet-like separator interposed therebetween.

3. A nickel-zinc storage battery according to claim 1 wherein the collector of said sheet-like zinc electrode is one selected from the group consisting of the metal net of silver, silver-plated copper or nickel, an expanded metal and a punched metal; and the collector of said sheet-like nickel electrode is one selected from the group consisting of the net of nickel or nickel-plated metal, an expanded metal and a punched metal.

4. A nickel-zinc storage battery according to claim 1 wherein said metal oxide having low solubility to alkali solution is one selected from the group consisting of magnesium oxide, calcium oxide, titanium oxide, zirconium oxide, aluminium oxide, β-alumina, and the mixtures thereof.

5. A nickel-zinc storage battery according to claim 1 wherein said boron compound is one selected from the group consisting of oxides of boron, boric acid, metaboric acid and the salts thereof.

6. A nickel-zinc storage battery according to claim 1 wherein said alkali-resisting nonwoven fabric is made of one synthetic resin selected from the group consisting of polyethylene, polystyrene, polyamid and acrylonitrile-vinyl chloride copolymer and the mixtures thereof.

* * * * *